United States Patent Office 3,481,045
Patented Dec. 2, 1969

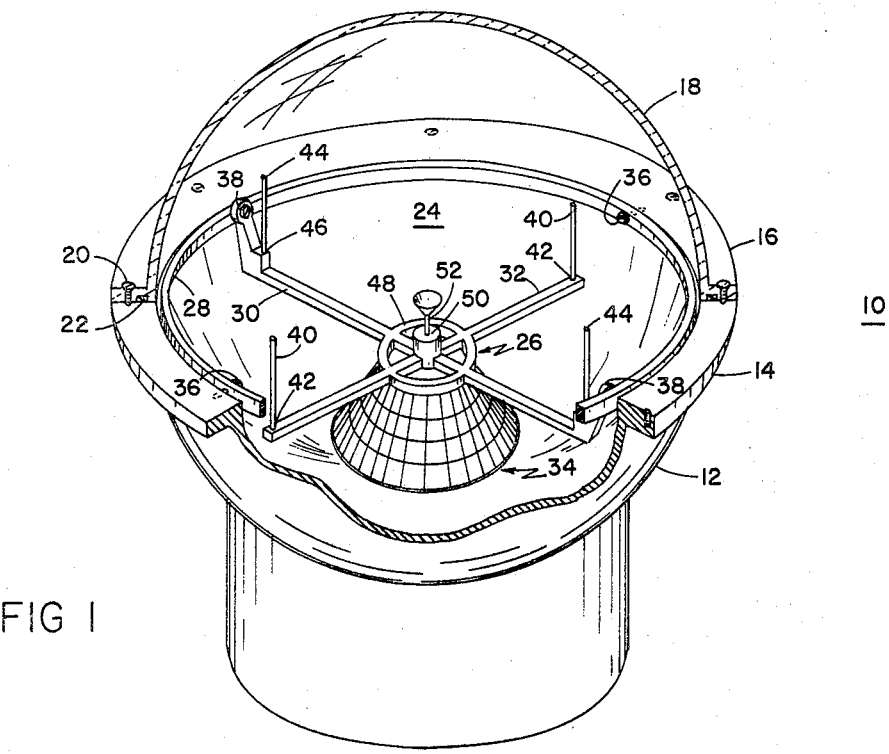
FIG 1
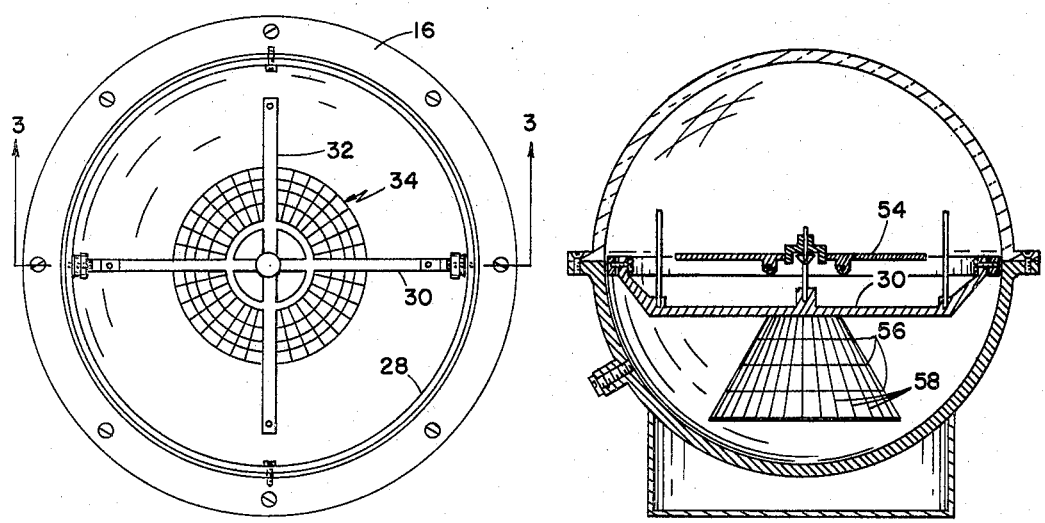
FIG 2
FIG 3

3,481,045
DAMPED SUPPORT STRUCTURE FOR COMPASS CARDS
Wilfrid Gordon White, Yarmouth, Maine, assignor to Maximum, Inc., Nashua, N.H., a corporation of New Hampshire
Filed Sept. 12, 1966, Ser. No. 578,583
Int. Cl. G01c 17/08
U.S. Cl. 33—223
3 Claims

ABSTRACT OF THE DISCLOSURE

Compass card support structure incorporating damping means characterized by a fluid enveloping damping web.

---

This invention relates to improvements in damped support members for use in magnetic compasses.

Compass cards immersed in damping fluid in spherical magnetic compasses have been supported by a pan-like damping member cardanically mounted concentric to, and parallel with, the compass card. The nearness of the member to the compass card impedes the azimuthal response of the compass card due to the fluid coupling of the card with the member, which coupling is not unlike the action of a fluid clutch. Undesirable forces which move the member, especially those forces resulting in vertical movement, i.e., movement of the card about its pivot which results in the card becoming inclined to the horizontal, and movement of the card which does not disturb the position of the card parallel to the horizontal, are related to the card through fluid coupling of the card and the member. The relatively high mass of the member make it slow to start and stop resulting in an overdamped action. In addition, the member effectively bisects the fluid in the compass so that the weight of the fluid adds to the inertia that must be overcome in order to adjust the member to a new position. And once moving, the inertia of the fluid and the member carries the member past the desired position. Any departure of the member from the movement of the fluid, such as caused by desirable damping action, causes eddy currents and turbulence which upset the member and thus the closely coupled card.

When used in sailing vessels the member supports the lubber line, and thwartship line, indicators. Disrupting the relation between the member and the card tilts the lubber line and thwartship line indicator causing the compass to indicate false headings. Such disruptions are caused by the member being slower than the card to adjust to new positions due to its greater mass. False headings are also caused by the sluggish response of the member in the fore and aft plane where frequent, fast acceleration forces commonly occur.

Accordingly, it is an object of this invention to provide a damped support member which has minimum fluid coupling to the compass card, and which presents different damping characteristics along different axes of the compass.

It is a further object of this invention to provide such a member in which the damping element is light and does not communicate local turbulence near the damping element to the compass card.

The invention features a compass having a compass card and damping fluid including a gimbal ring connected to the housing of the compass for rotation about a first diametric axis of the ring. A suspension arm is connected to the ring for rotation about a second diametric axis of the ring transverse to the first axis, and a support arm is transverse to, and rigidly connected to, the first suspension arm. A lubber line indicator is connected to one, and a thwartship line indicator is connected to the other, of said suspension and support arms. A compass card mounting is carried by the suspension and support arms and a damping web is suspended from them. The web has a geometric configuration that envelops a portion of the damping fluid and has a plurality of damping surfaces providing a substantial damping effect along at least two axes.

Other objects, features, and advantages will appear from the following description of a preferred embodiment of the invention, taken together with the attached drawings thereof, in which:

FIG. 1 is a perspective view of a spherical compass containing the suspension and support arms and damping member of this invention with compass card removed, and the base and cover partially broken away.

FIG. 2 is a reduced top view of the compass of FIG. 1 with the cover and compass card removed.

FIG. 3 is a sectional view along line 3—3 of FIG. 2.

Referring to FIG. 1 there is shown a spherical compass 10 having a base 12 with flange 14 secured to flange 16 of cover 18 by screws 20. Gasket 22 between said flanges prevents leakage of damping fluid 24.

The damped support member 26 is composed of gimbal ring 28, thwartship line support arm 30, lubber line suspension arm 32, and damping web 34. Gimbal ring 28 is fastened to base 12 by outer trunnions 36 for rotation about the fore and aft axis of the compass. Thwartship line suspension arm 30 is fastened to gimbal ring 28 by by inner trunnions 38 for rotation about the thwartship axis of the compass coincident with a diameter of the gimbal ring, FIG. 2. Lubber line support arm 32 and thwartship line suspension arm 30 are connected so that their center points coincide.

The lubber line is indicated by pins 40 mounted in bores 42 at either end of support arm 32 and the thwartship line is indicated by pins 44 mounted in bores 46 at either end of supension arm 30. Damping web 34 is suspended from attachment ring 48 in fluid 24. Post support 50 at the intersection of arms 30 and 32 receives jewel post 52 on which compass card 54 is pivotally balanced, FIG. 3. Although arms 30 and 32 and ring 48 are shown integrally formed, this construction is not essential to the invention, only convenient.

Damping web 34 has the configuration of a truncated cone formed by five concentric damping rings 56, that increase in diameter toward the base of the web, fastened to thirty-six damping rods 58. Web 34 envelopes a volume of damping fluid 24 and it provides substantial damping for both major axes of the compass: the thwartship line axis and the lubber line axis. The web may have a hemispherical, conical, pyramidical, cylindrical or any other shape without departing from the inventive concept. The configuration selected for the web need not be symmetrical, because in damping the lubber line support arm 32 it damps a substantially smaller mass than it does in damping thwartship line support arm 30 which includes the mass of gimbal ring 28.

In operation there are frequent forces of short duration and small magnitude, which occur mainly along the lubber line axis, and which are due primarily to acceleration forces on the vessel in which the compass is mounted. These forces are primarily effective on arm 32 whose low moment of inertia make it fast to react and relocate in response to the disorienting forces. Less frequent are the forces of longer duration and greater magnitude, which occur mainly along the thwartship line axis due primarily to rolling of the vessel. These forces are mainly effective on arm 32 which moves in combination with gimbal ring 28. The greater mass of this combination is desirable in this axis where the disorienting forces are large and normally slow in coming.

Movement of either arm 30 or 32 forces web 34 through damping fluid 24. Eddy currents are generated which dissipate the forces tending to move the particular arm thus damping the movement. And, because the web is not proximate the compass card, these eddy currents have little effect on the compass card. The lighter and more delicate compass card is therefore free to independently contribute to its own stability.

What is claimed is:

1. A damped compass card support structure for magnetic compasses of the class having the compass card immersed in damping fluid in a spherical housing, comprising:
   a gimbal ring connected to said housing for rotation about a first diametric axis of said ring;
   a suspension arm connected to said ring for rotation about a second diametric axis of said ring transverse to said diametric axis;
   a support arm transverse to said first arm and rigidly connected to said suspension arm;
   a lubber line indicator;
   a thwartship line indicator, one of said suspension and support arms supporting said lubber line indicator, the other supporting said thwartship line indicator;
   a compass card mounting attached to said suspension and support arms; and
   a damping web extending from said suspension and support arms in the direction opposite to said compass card, said web having a geometric configuration that envelopes a portion of said damping fluid, said web further having a plurality of damping members which provide substantial damping about at least two axes, said members including a first set of spaced elements extending away from said compass card; said members also including a second set of elements, disposed generally transverse to said first set of elements, and connected to said first set of elements.

2. The compass support structure of claim 1 in which said suspension arm supports said thwartship line indicator, said support arm supports said lubber line indicator, and said gimbal ring is connected to said compass housing so as to be rotatable about its diameter parallel to the fore and aft axis of the compass.

3. The compass support structure of claim 1 in which said web has a truncated conical form, said first set of elements being in the surface of the conical form, said second set of elements being coaxial circles disposed generally perpendicular to the altitude of said conical form, said circles decreasing in diameter from the base to the top of said conical form.

References Cited

UNITED STATES PATENTS

| 1,122,794 | 12/1914 | Nelson et al. | |
| 2,428,346 | 9/1947 | White | 33—223 |

FOREIGN PATENTS

| 323,583 | 11/1902 | France. |
| 1,910 | 1878 | Germany. |
| 501,414 | 7/1930 | Germany. |
| 4,374 | 11/1819 | Great Britain. |
| 507,889 | 6/1939 | Great Britain. |

ROBERT B. HULL, Primary Examiner